May 26, 1925.
C. CHEREPES
WINDMILL
Filed June 22, 1923
1,539,157
6 Sheets-Sheet 3
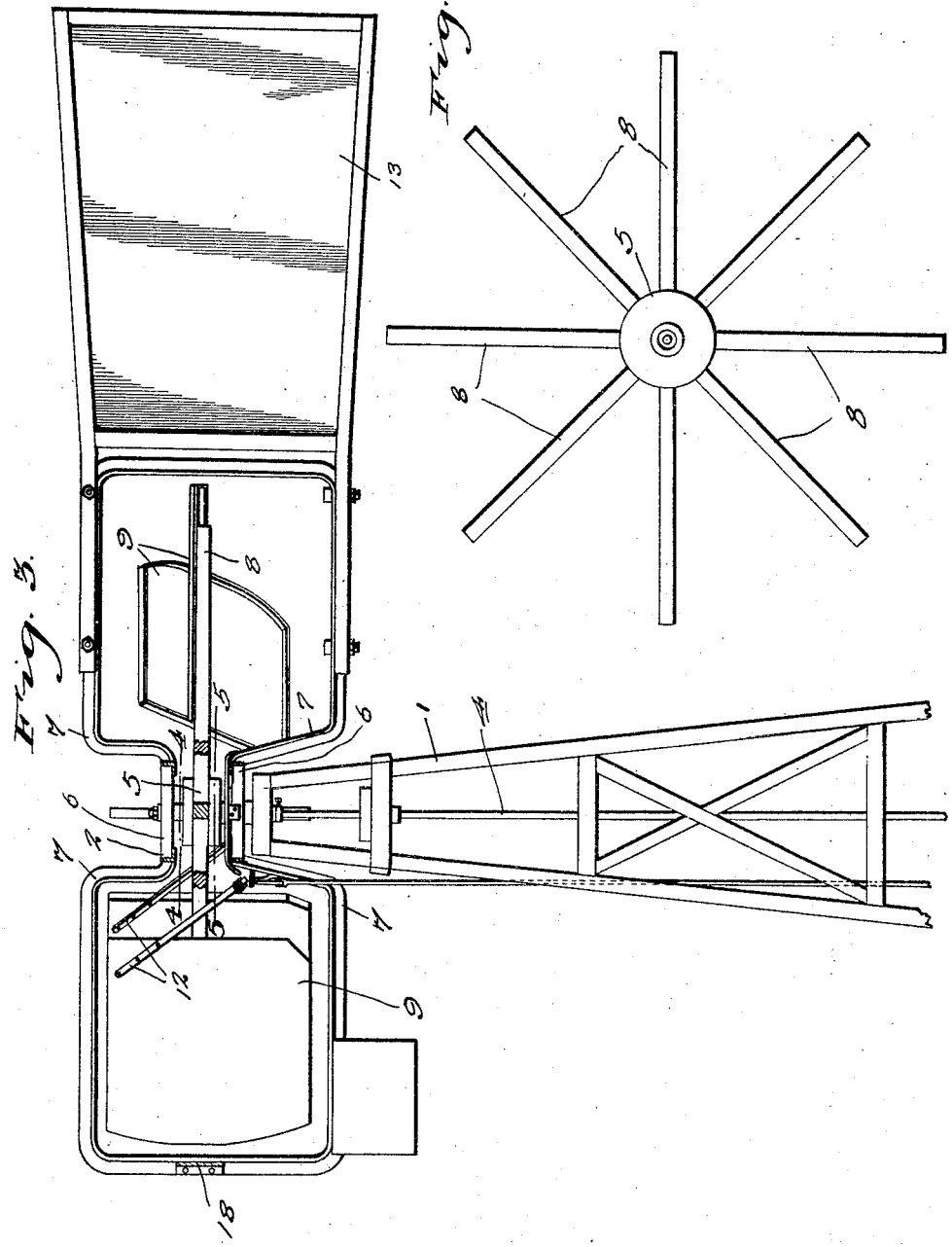
Charles Cherepes INVENTOR
BY Victor J. Evans
ATTORNEY

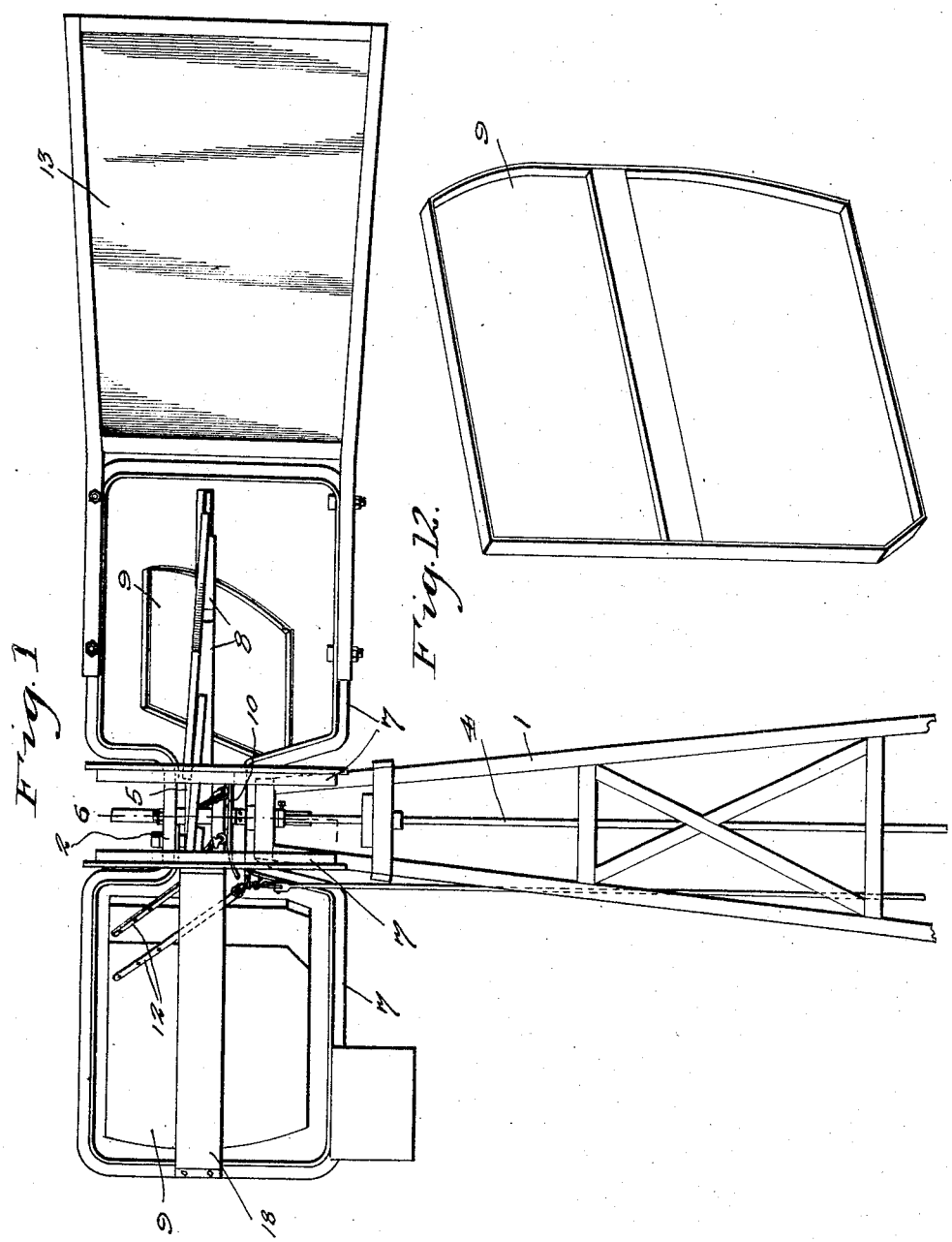

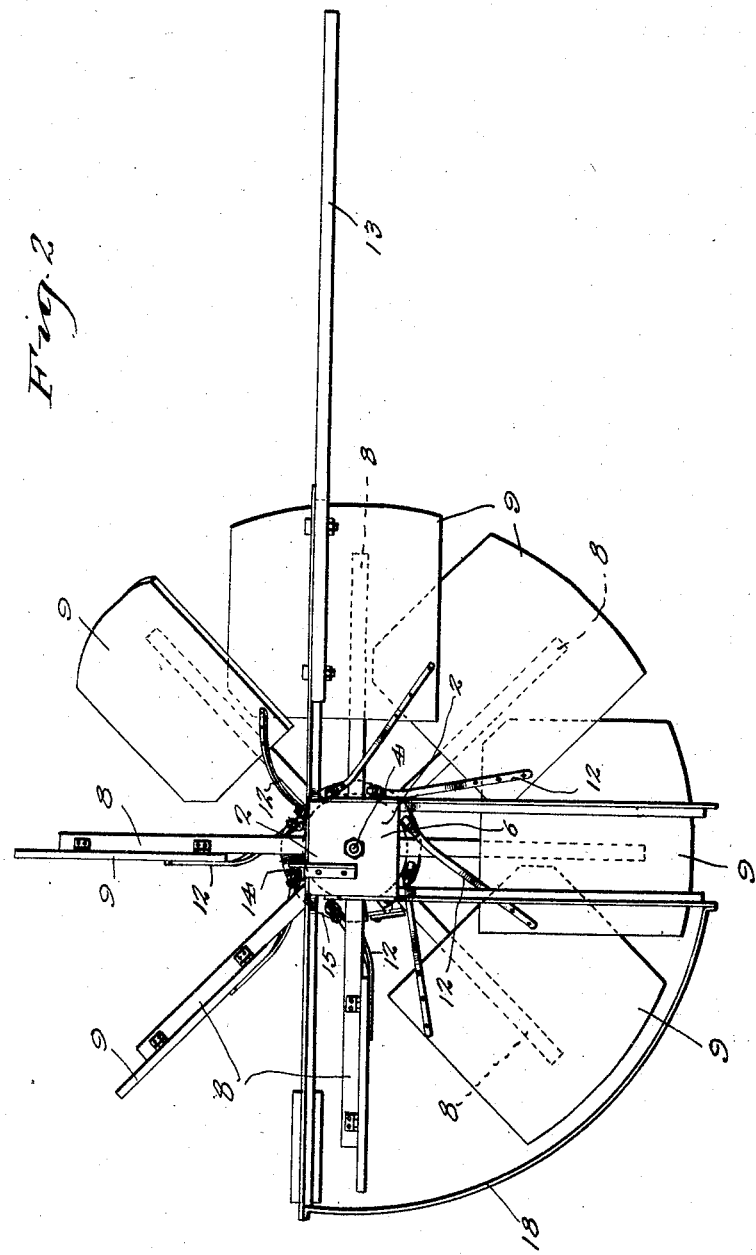

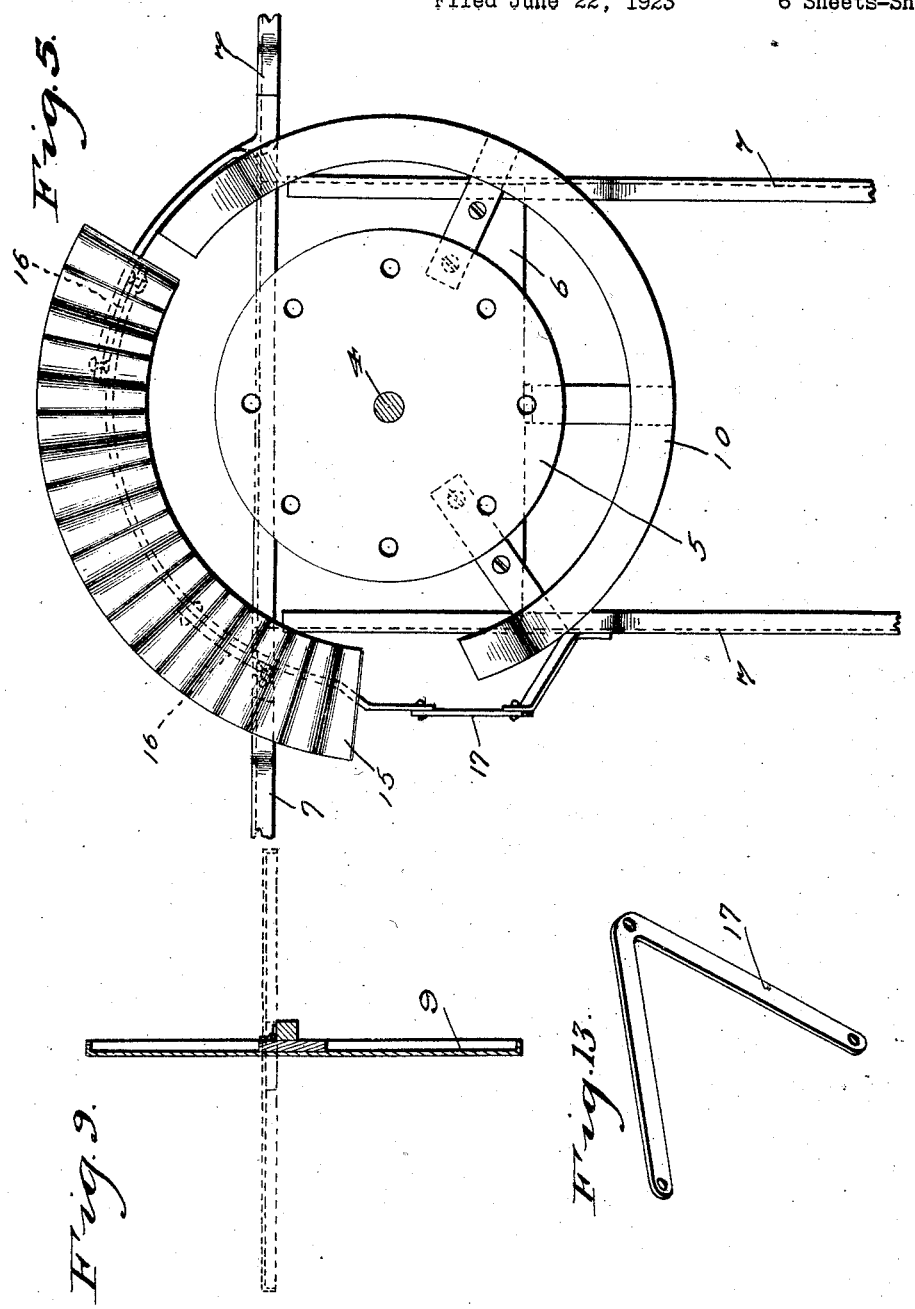

May 26, 1925.  
C. CHEREPES  
WINDMILL  
Filed June 22, 1923  
1,539,157  
6 Sheets-Sheet 5
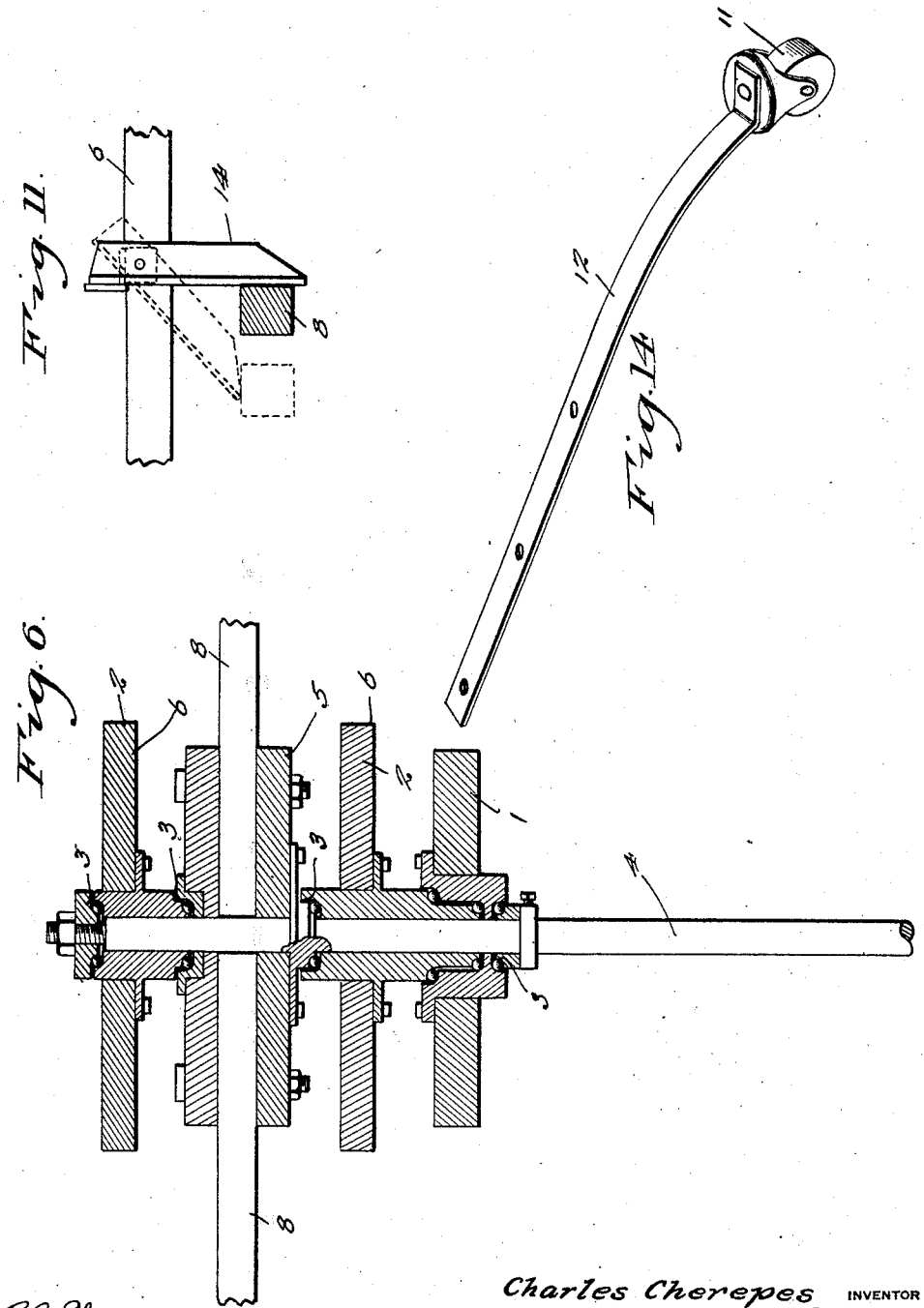
Charles Cherepes INVENTOR May 26, 1925. 1,539,157
C. CHEREPES
WINDMILL
Filed June 22, 1923 6 Sheets-Sheet 6
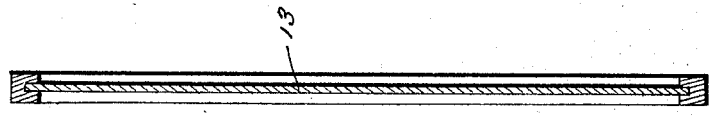
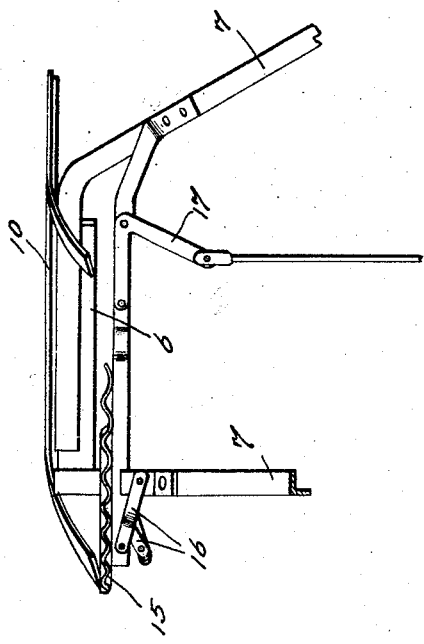
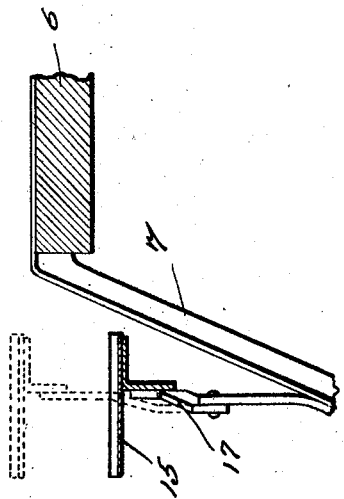
Charles Cherepes INVENTOR
ATTORNEY
WITNESSES Patented May 26, 1925.

1,539,157

UNITED STATES PATENT OFFICE.

CHARLES CHEREPES, OF TOLEDO, OHIO.

WINDMILL.

Application filed June 22, 1923. Serial No. 647,164.

*To all whom it may concern:*

Be it known that I, CHARLES CHEREPES, a citizen of the United States, residing at Toledo, in the county of Lucas and State of Ohio, have invented new and useful Improvements in Windmills, of which the following is a specification.

This invention relates to a wind mill, the general object of the invention being to so form the parts that a great deal of power will be secured with but little strain on the tower.

Another object of the invention is to provide a series of blades with means for holding them horizontally when they are moving against the wind and for moving them in a vertical position when they are moving with the wind.

A still further object of the invention is to provide means for preventing the blades from assuming a vertical position when it is desired to stop the wheel so that the wind cannot act upon the blades.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and which:—

Figure 1 is an elevation of the invention.
Figure 2 is a plan view.
Figure 3 is a longitudinal sectional view.
Figure 4 is a section on line 4—4 of Figure 3.
Figure 5 is a section on line 5—5 of Figure 3.
Figure 6 is a section on line 6—6 of Figure 1.

The remaining 8 figures are detail views.

In these views 1 indicates a tower and 2 indicates a frame which is rotatably supported at the top of the tower by means of the bearings 3. A vertical shaft 4 is journaled in the tower and a hub 5 is connected with the upper end of the shaft and said hub is arranged between the upper and lower portions of the frame 2, said frame being composed of the spaced hubs 6 and the arc-shaped parts 7 which are connected with the hubs. Arms 8 radiate from the hub 5 and the blades 9 are hinged to these arms, the arms and blades passing through the yokes 7. An arc-shaped track 10 is carried by the frame 2 with its ends bent downwardly and rollers 11 carried by arms 12 on the blades engage said track in such a manner that the blades will assume a vertical position when their rollers are not in engagement with the track but as soon as the roller strikes one end of the track the roller will ride up the track and thus move the blade to a horizontal position. The blade will remain in this position until the roller runs off the other end of the track when the blade will again assume a vertical position. In a vertical position the blades will be acted upon by the wind, a tail 13 being secured to one of the yokes 7 to hold the device in the wind.

It will thus be seen that when the blades are in a vertical position they will offer resistance to the wind so that the wheel, composed of the hub 5, the arms 8 and the blades 9, will be rotated and as soon as the blades pass to a position where they will be moving against the wind their rollers will engage the track so that they will be moved into horizontal position and thus offer but little resistance to the wind. This movement of the wheel will be communicated to the shaft 4 which may be attached to a pump or any other machinery. A latch 14 is arranged on the upper hub 6 of the frame 2 and engages the arms 8 for preventing rearward movement of the wheel.

In order to stop the wheel and hold it inactive I provide a movable track section 15 which is adapted to occupy a space between the ends of the track 10 when in raised position and thus prevent the blades from assuming a vertical position. This section of the track is composed of a corrugated strip, which, when engaged by the rollers, will act as a brake and thus bring the wheel to rest. This track section is connected to a part of the frame by the links 16 so that it is capable of being moved bodily and it is raised and lowered by means of a lever 17. When it is in its lowered position it will not be engaged by the rollers.

I may provide a shield 18 for shielding the blades, when in horizontal position, from the wind, this shield being carried by the bights of some of the yokes 7.

From the foregoing it will be seen that I have produced a wheel, the blades of which, when in vertical position, will be acted upon by the wind while the horizontal blades will offer but little resistance to the wind so that a great deal of power is produced. The parts are so arranged as to give but little strain on the tower and the movable section of the track presents simple and effective means for stopping the wheel and holding it in inactive position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A windmill of the class described comprising a tower, a wheel rotatably mounted at the top thereof, a shaft connected with the wheel, said wheel having blades hinged thereto off center so that the blades will normally occupy a vertical position, a cam-shaped track, projections on the blades for engaging the track for moving the blades to a horizontal position and a movable part between the ends of the track for engaging the projections, when in raised position, to prevent the blades from assuming a vertical position, said movable part being formed of a corrugated strip which acts as a brake when engaged by the projections on the blades.

2. A windmill of the class described comprising a tower, a frame rotatably mounted at the upper end thereof, a tail carried by the frame, a wheel rotatably mounted within the frame, a shaft connected with the wheel, blades hinged to the spokes of the wheel off center so that they normally occupy a vertical position, an arc-shaped track having bent ends, arms on the blades, a roller on each arm for engaging the track to move the blade into horizontal position, a movable section of track arranged in the space between the ends of the first track which acts to prevent the blades assuming a vertical position when raised, the movable section being corrugated so that it will act as a brake for the blades, manual means for raising and lowering the movable section of track, a latch for preventing retrograde movement of the wheel and a wind shield connected with the frame for shielding the horizontally arranged blades from the wind.

In testimony whereof I affix my signature.

CHARLES CHEREPES.